United States Patent
Maruyama et al.

(10) Patent No.: US 6,847,775 B2
(45) Date of Patent: Jan. 25, 2005

(54) ACCOMMODATION APPARATUS FOR TRANSMISSION MEDIUM

(75) Inventors: Takeshi Maruyama, Tokyo (JP); Hiroyuki Tomino, Tokyo (JP)

(73) Assignee: Allied Telesis K.K. (JP)

( * ) Notice: Subject to any disclaimer, the term of this patent is extended or adjusted under 35 U.S.C. 154(b) by 0 days.

(21) Appl. No.: 10/190,901

(22) Filed: Jul. 8, 2002

(65) Prior Publication Data

US 2003/0092309 A1 May 15, 2003

(30) Foreign Application Priority Data

Nov. 12, 2001 (JP) ........................................ 2001-346770

(51) Int. Cl.[7] ................................................. G02B 6/00
(52) U.S. Cl. ...................................... 385/135; 439/929
(58) Field of Search ................................ 385/135, 136, 385/137; 439/929

(56) References Cited

U.S. PATENT DOCUMENTS

| | | | | |
|---|---|---|---|---|
| 4,861,134 A | * | 8/1989 | Alameel et al. | |
| 5,469,526 A | * | 11/1995 | Rawlings | 385/135 |
| 5,966,492 A | * | 10/1999 | Bechamps et al. | 385/135 |
| 6,058,235 A | * | 5/2000 | Hiramatsu et al. | 385/135 |
| 6,208,797 B1 | * | 3/2001 | Vanderhoof et al. | 385/135 |
| 6,396,990 B1 | * | 5/2002 | Ehn et al. | 385/135 |
| 6,543,940 B2 | * | 4/2003 | Chu | 385/53 |

FOREIGN PATENT DOCUMENTS

| | | | |
|---|---|---|---|
| JP | 63-144605 | 9/1988 | G02B/6/24 |
| JP | 3-73901 | 7/1991 | G02B/6/00 |
| JP | 5-84902 | 11/1993 | G02B/6/00 |
| JP | 09-197167 | 7/1997 | G02B/6/24 |
| JP | 10-227925 | 8/1998 | G02B/6/00 |
| JP | 2001-296432 | 10/2001 | G02B/6/00 |

* cited by examiner

*Primary Examiner*—Niel Abrams
(74) *Attorney, Agent, or Firm*—Leah Sherry; Dechert LLP

(57) ABSTRACT

There is provided an accommodation apparatus for a transmission medium, such as an optical fiber cable which includes a housing for accommodating the transmission medium and an arrangement part located in the housing, said arrangement part arranging an orientation of the transmission medium accommodated in the housing so as to prevent the transmission capability of the transmission medium from getting damaged. The arrangement part may include downwardly extending L-shaped posts 116 about which the cable 10 may be wound in a space enclosed by a bottom cover 130. The housing top side 110A is to support an optical to electrical media converter 200 and includes a raised part 114 with an opening 118*a* for receiving a projecting port 214 of the media connector.

14 Claims, 8 Drawing Sheets

(b)

ACCOMMODATION APPARATUS FOR TRANSMISSION MEDIUM

BACKGROUND OF THE INVENTION

The present invention relates to accommodation apparatuses for accommodating a transmission medium. The present invention is suitable, for example, for an accommodation apparatus for accommodating an extra portion of an optical fiber cable ("OFC") connected to a communication device.

The recent development of the information-oriented society has promoted frequent information transmissions. In general, the information transmission uses transmission media, such as a cable, and an OFC among them has multipurpose utility because it may effectively transmit data over a long distance at a much higher speed than those of conventional pair line or coaxial metallic cable. The OFC is a glass or plastic made thin line for transmitting an optical signal, and has a concentric shape in which a clad covers a center core. The OFC efficiently transmits a signal far away as an optical signal enclosed in the core using a difference between core and clad light diffractive indexes and the total reflection of the optical signal.

For example, a high-speed Local Area Network ("LAN") that achieves a base band signal transmission at a transmission speed of 100 Mbps is called the 100BASE standard, and includes the 100BASE-TX and 100BASE-FX. The 100BASE-TX uses an Unshielded Twisted Pair ("UTP") cable as a transmission medium, while 100BASE-FX uses an OFC as a transmission medium. The OFC has great utility for providing not only a LAN Ethernet with signal transmissions over several kilometers but also the Fiber To The Home ("FTTH") inexpensively. A media converter usually converts a signal between two transmission media. The media converter, as used herein, is a device that converts a signal propagating through one transmission medium to a signal for a different transmission medium. These different transmission media include, for instance, an UTP and an OFC and, and an OFC (of a single mode) and an OFC (of a multimode).

It is difficult to handle an OFC except for engineers. The OFC is made of such fragile materials as the above core and clad, and the curvature less than a permissible value would lessen the transmission capability and damage the OFC. An engineer usually lays out an OFC, but users sometimes have to handle it. For example, once an engineer properly attaches the media converter, a user should take over its handling.

While the OFC has a length specified by the standard, the standardized length is sometimes not optimal to service conditions. For example, when the OFC has an extra length, it is conceivable that a user applies an unintentional force, thereby bending the cable or damaging a connection between the media converter and the OFC or undesirably damaging its transmission capability.

It is conceivable to accommodate the OFC to protect from an external force, but a mere accommodation is not enough for the accommodated cable. That is, the accommodated condition must assist in maintaining OFC's transmission capability.

BRIEF SUMMARY OF THE INVENTION

Therefore, it is an exemplified object of the present invention to provide an accommodation apparatus for accommodating a transmission medium without deteriorating its transmission capability.

In order to attain the above object, an accommodation apparatus of one aspect of the present invention for a transmission medium includes a housing for accommodating the transmission medium, and an arrangement part, located in the housing, for arranging an orientation of the transmission medium accommodated in the housing so as to prevent a transmission capability of the transmission medium from getting damaged. This accommodation apparatus protects the transmission medium from an external force by accommodating the transmission medium in the housing. In addition, the arrangement part arranges an orientation of the accommodated transmission medium in the housing and prevents its transmission capability, whereby the transmission medium may be effectively accommodated while its transmission capability is maintained.

An accommodation apparatus of another aspect of the present invention for a transmission medium includes a housing for accommodating the transmission medium, and an arrangement part, located in the housing, for arranging an orientation of the transmission medium accommodated in the housing so that the transmission medium has a predetermined curvature. This accommodation apparatus protects the transmission medium from an external force by accommodating the transmission medium in the housing. In addition, the arrangement part arranges an accommodation orientation of the transmission medium in the housing and maintains its curvature equal to or larger than a predetermined curvature. Thereby, the transmission medium may be effectively accommodated while its transmission capability is maintained. The predetermined curvature is, for example, a radius of curvature of 30 mm or larger.

In the above accommodation apparatus, the transmission medium may be an OFC. The OFC is made of fragile materials, such as glass or plastic, and the inventive accommodation apparatus is suitable for an accommodation of the OFC.

In the above accommodation apparatus, the housing may be mounted with an external apparatus connectable to the accommodated transmission medium. The accommodation apparatus serves as a support stand. This accommodation apparatus supports the external apparatus connected to the accommodated transmission medium, fixes a positional relationship between the transmission medium and external apparatus, and does not deteriorate a connection condition between them. Thereby, the accommodation apparatus may maintain a proper transmission condition of the transmission medium with the external apparatus. In the above accommodation apparatus, the housing may have an opening that enables the accommodated transmission medium to be connected to an external apparatus or another transmission medium. This accommodation apparatus may make the transmission medium usable while accommodating it. This accommodation apparatus is suitable for an accommodation of an extra cable. The inventive accommodation apparatus may further include a protection part for protecting a connection part between the transmission medium and an external apparatus connectible to the transmission medium, thus preventing coming-off of the transmission medium and deterioration of the connection under the external force to the connection part. The protection part may have a connection opening that enables the external apparatus to be connected to the transmission medium when the external apparatus is mounted onto the housing, and a convex shape that covers the transmission medium around the connection opening. The protection part may be formed by partially raising the housing. The external apparatus is, for example, a media converter.

The arrangement part may have an approximately L shape to properly hold the transmission medium. The L shape contributes to a further protection of the transmission medium by preventing the gravity drawdown. The housing may have a mechanical splice for connecting the transmission medium to another transmission medium.

An accommodation apparatus still another aspect of the present invention includes a support part which is attached to a media converter that converts a signal for a first transmission medium to a signal for a second transmission medium; and an arrangement part for winding the first transmission medium so that the first transmission medium has a predetermined radius of curvature or larger. The accommodation apparatus may further include a connection part for connecting the media converter to the first transmission medium. The first transmission medium may be an optical fiber cable and the second transmission medium may be an unshielded twisted pair cable.

Other objects and further features of the present invention will become readily apparent from the following description of preferred embodiments with reference to accompanying drawings.

DETAILED DESCRIPTION OF THE PREFERRED EMBODIMENTS

Figure 1:
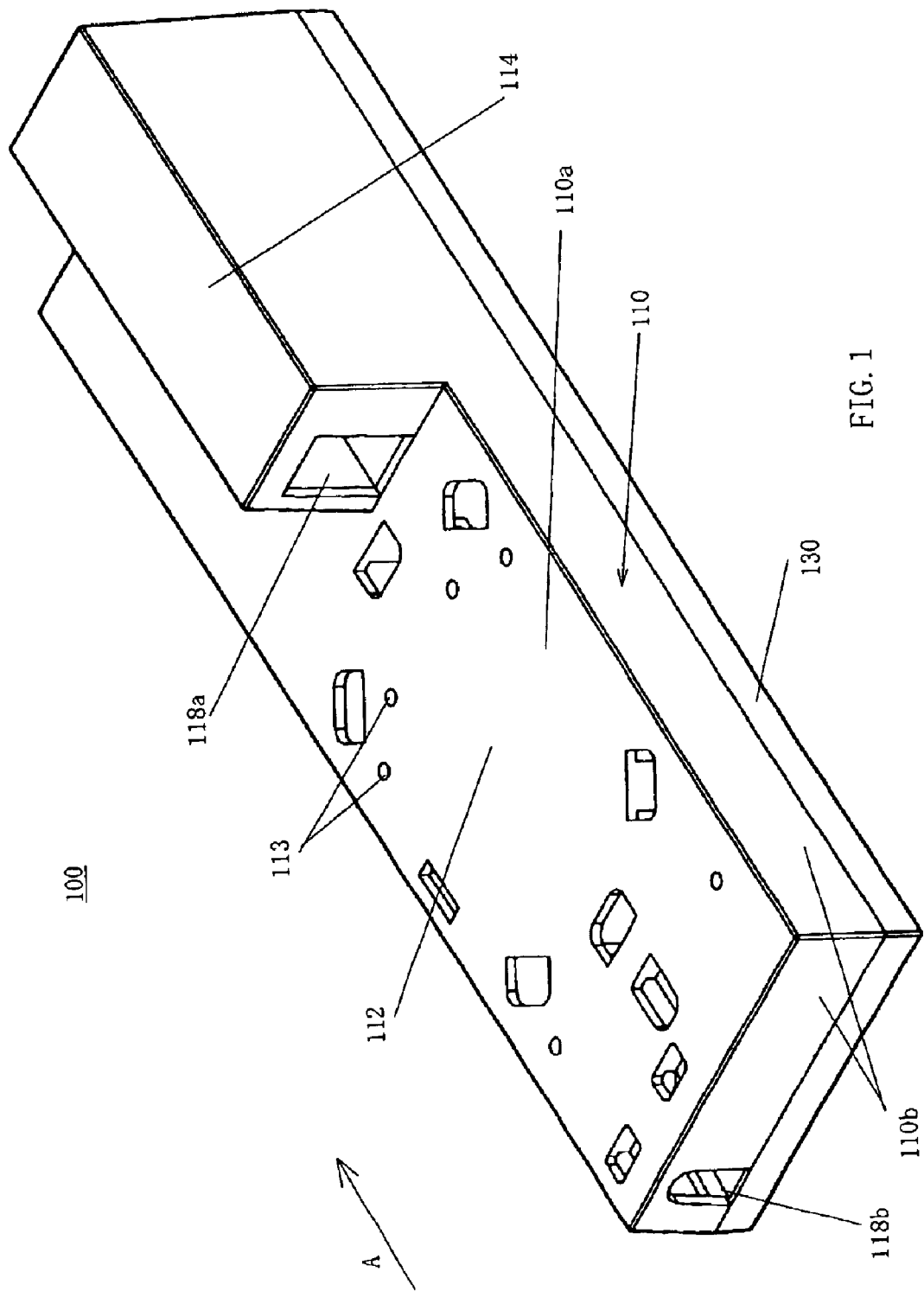
FIG. 1 is a schematic perspective view of an accommodation apparatus of the present invention.
Figure 2:
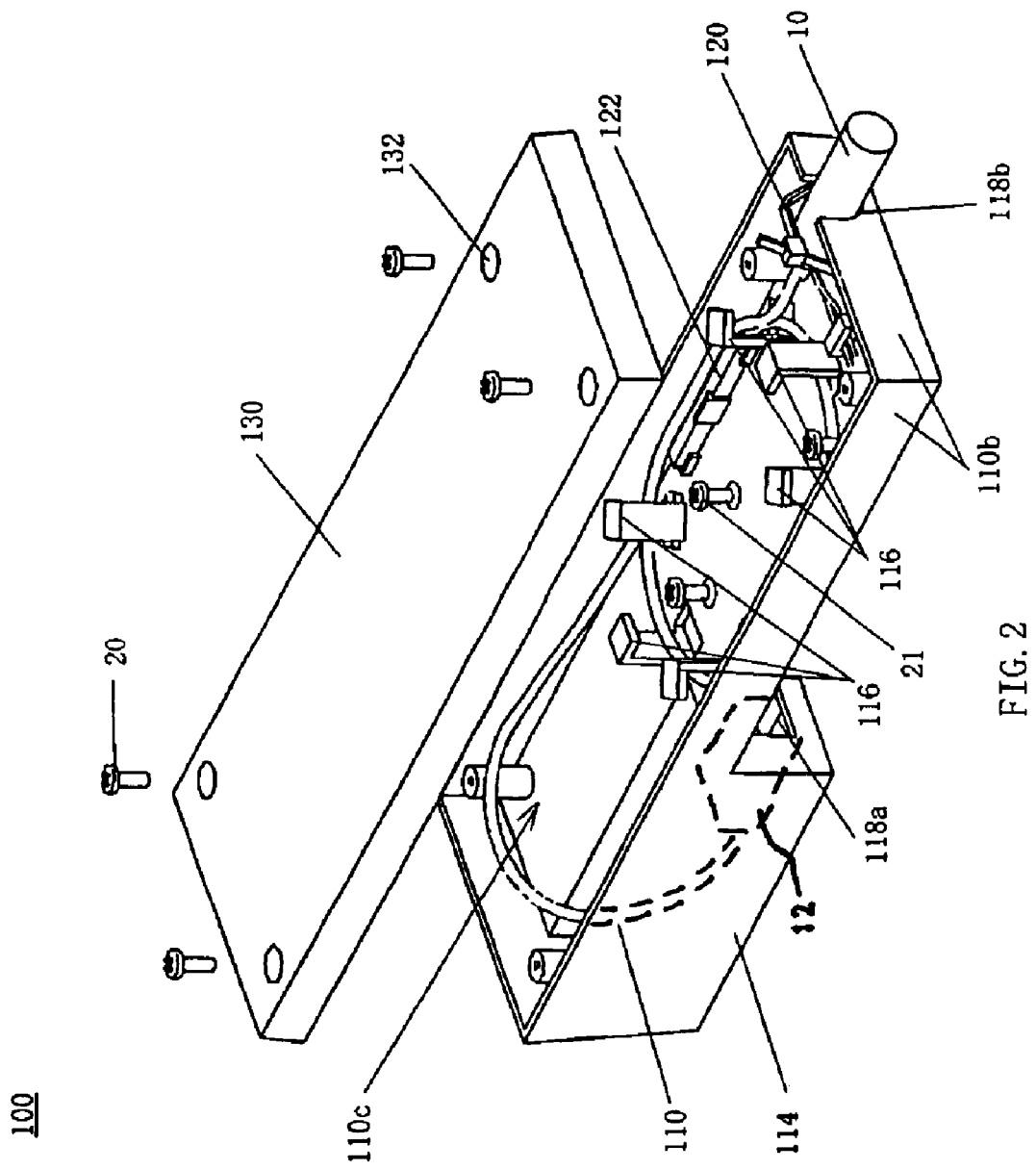
FIG. 2 is an exploded perspective view of the accommodation apparatus shown in FIG. 1, which accommodates an optical fiber cable.
Figure 3:
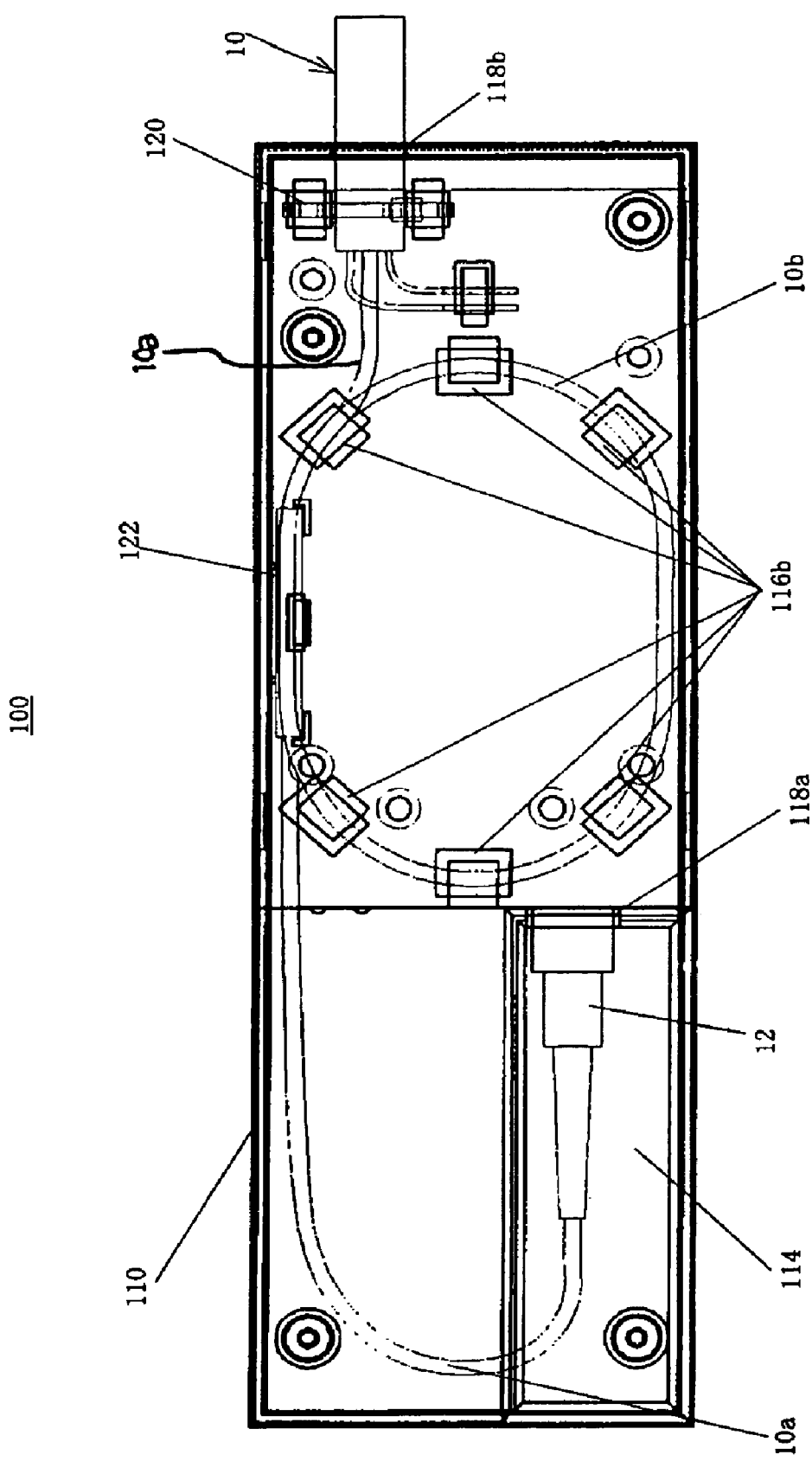
FIG. 3 is a schematic bottom view of the accommodation apparatus shown in FIG. 1, which accommodates an optical fiber cable.

A description will now be given of an accommodation apparatus 100 of the present invention with reference to the accompanied drawings. Here, FIG. 1 is a schematic perspective view of the accommodation apparatus 100. FIG. 2 is an exploded perspective view of the accommodation apparatus 100, which accommodates an OFC 10. FIG. 3 is a schematic bottom view of the accommodation apparatus 100, which accommodates the OFC 10. In each figure, the same reference numeral designates the same element, and a duplicate description will be omitted. In addition, the same reference numeral with an alphabetical capital generally denotes a variation, and the reference numeral without the alphabetical capital generalizes all the same reference numerals with an alphabetical capital.

The accommodation apparatus 100 is a device for accommodating an extra part of OFC 10 connectible with an external device (or media converter 200 in the instant embodiment), and includes a body 110 and a cover 130. In the inventive accommodation apparatus 100, the cover 130 is removably attached to a bottom surface 110c of the body 110, and the OFC 10 may be accommodated in the body 110 by detaching the cover 130 from the bottom surface 110c. A connection between the body 110 and the cover 130 may use screws 20, as shown in FIG. 20, and other mechanical means. The body 110 and cover 130 in the accommodation apparatus 100 may be made, for example, of resin, woods, steel, etc. Preferably, the accommodation apparatus 100 may be made of a properly rigid material so as to protect the OFC 10 and support the external apparatus, as will be described later. The accommodation apparatus 100 may be made of a properly rigid material so as to protect the OFC 10 and support the external apparatus, as will be described later. The accommodation apparatus 100 is dimensioned such that the OFC 10 has a predetermined curvature, as will be discussed later. Of course the size of the accommodation apparatus 100 is determined based on a size of the external apparatus to be mounted and, its portability and aesthetic external appearance, etc.

The body 110 accommodates the OFC 10, and protects the OFC 10 from getting bent and damaged by an external force, and a connection between the OFC 10 and the external apparatus. The accommodation apparatus in this embodiment accommodates the extra part of the OFC 10 while maintaining a proper curvature of the OFC 10 so as to prevent its deteriorated transmission performance.

Figure 4A:
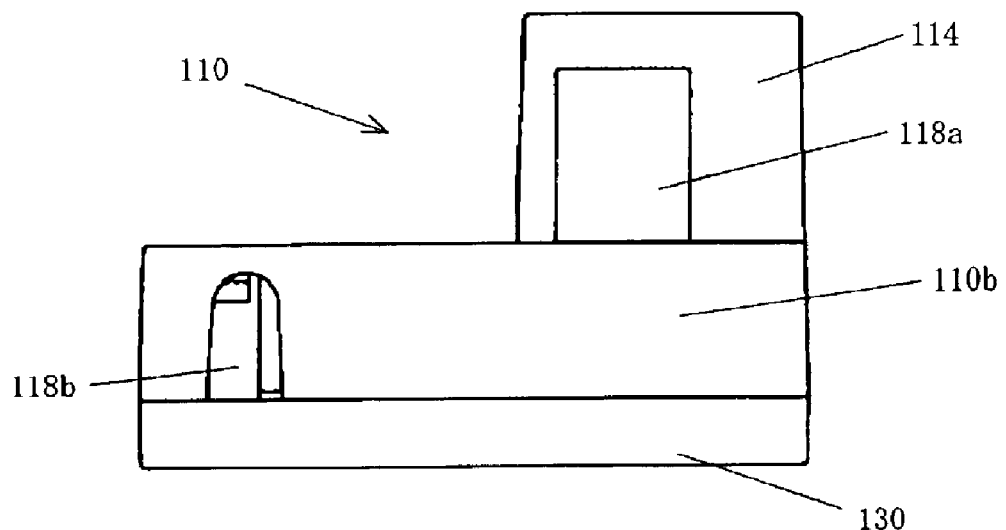
FIGS. 4A and 4B are schematic side views showing sides of the accommodation apparatus shown in FIG. 1.
Figure 4B:
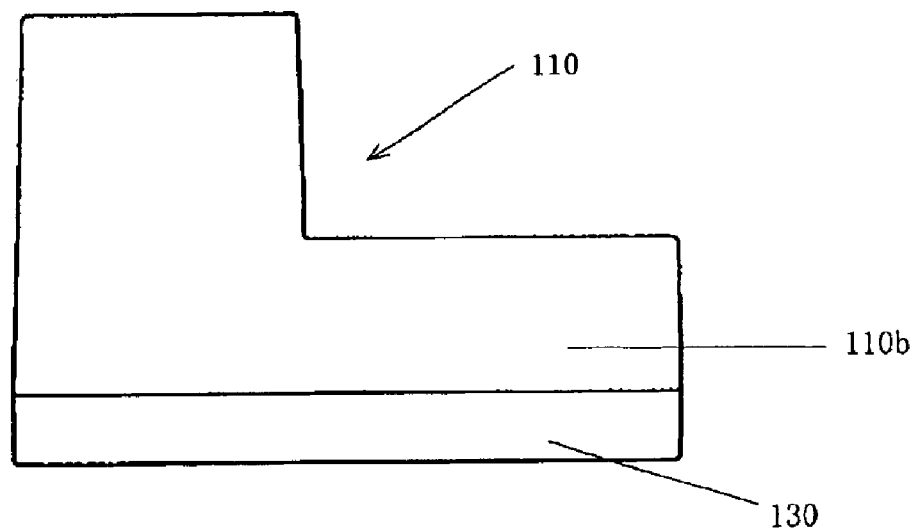

The body 110 includes a support part 112, a connection protecting part 114, locus arrangement parts 116, and openings 118a and 118b, and has an approximately rectangular shape when viewed from its top surface 110a. The body becomes a close box when the cover 130 is attached to it. As shown in FIG. 1, the support part 112 is formed on part of the body top surface 110a, i.e., a surface opposite to that connected to the cover 130, and the connection protecting part 114 is formed as a convex shape raised from part of the body 110 adjacent to the support part 112 on the body top surface 110a. As shown in FIGS. 4A and 4B, the body 110 has approximately L-shaped sides when viewed from a direction A (or a direction opposite to the direction A). Here, FIGS. 4A and 4B are schematic side views showing sides of the accommodation apparatus 100. As shown in FIGS. 2 and 3, a plurality of locus arrangement parts 116 are formed on a surface opposite to the support part 112 in the body 110, so as to form an approximately eclipse shape. Turning back to FIG. 1, the opening 118a is formed as an opening at a side of the connection protecting part 114 at a side of the connection protecting part 114 adjacent to the support part 112, while the opening 118 is formed as an opening at a body side surface 110b. When viewed from the direction A, as shown in FIG. 4A, the openings 118a and 118b are provided on the same side in this embodiment. However, the opening 118b may be positioned on the side surface 110b for convenience of pulling out of the OFC 10. A plurality of openings may be provided on the body side surface 110b to increase the number of selectable portions for the OFC 10 to the extent that the accommodated OFC 10 may keep a predetermined curvature or larger.

The support part 112 serves as a rack for the external apparatus connectible to the OFC 10 accommodated in the accommodation apparatus 100, and is a flat surface made of part of the body 110. The support part 112 has a plurality of screw holes 113 for removably attaching the external apparatus to the support part 112 through screws 21. The screw attachment between the support part 112 and the external apparatus makes the mounted external apparatus exchangeable, as well as fixing the external apparatus onto the support part 112 and thus a positional relationship between the external apparatus and the OFC 10 for a good connection between the OFC 10 and the external apparatus. The fixed configuration between the external apparatus and the OFC 10 does not affect their connection even under an external force. When the connection between the support part 112 and the media converter 200 does not use the screw attachment, the screw holes 113 do not have to be provided in the support part 112. The present invention does not limit a connection between the support part 112 and the external apparatus to the above screw attachment as long as the alternative exhibits similar operation and effect. For example, a connection between the support part 112 and the external apparatus may use an engagement by providing a convex part to one of them and a concave part to the other of them, or a band for fixing the external apparatus. Of course, the external apparatus may be non-removably fixed or non-fixedly mounted onto the support part 112. For example, the media converter 200 may be bonded and fixed onto the support part 112. Of course, the removable fixation, such as the screw attachment is superior to the non-removable fixation and non-fixed mount in view of the above effect.

The connection protecting part 114 creates a space through which the OFC 10 is introduced into the body 110 while maintaining a connection with the external apparatus. This space protects the OFC 10 connected to the external apparatus, and their connection. The connection protecting part 114, in FIG. 3, is provided on the body top surface 110a adjacent to the support part 112, and close to the side of the external apparatus mounted onto the support part 112. Specifically, the opening 118a, in FIG. 3, is located at the connection part between the external apparatus and the OFC 10. In this structure, the connection protecting part 114 has the aforementioned convex shape, and introduces, through the opening 118a, the OFC 10 connected to the external apparatus into the accommodation apparatus 100. Without the connection protecting part 114, a difference in height between the body top surface 110a and a connection part of the external apparatus would expose the OFC 10 connected to the external apparatus. However, the instant embodiment has the connection protecting part 114, in FIG. 3, to accommodate the connection part of the external apparatus and the OFC 10 in the accommodation apparatus 100, contributing to the protection of the OFC 10. As external apparatus is inserted into the opening 118a, it is automatically connected to the OFC 10.

Figure 5:
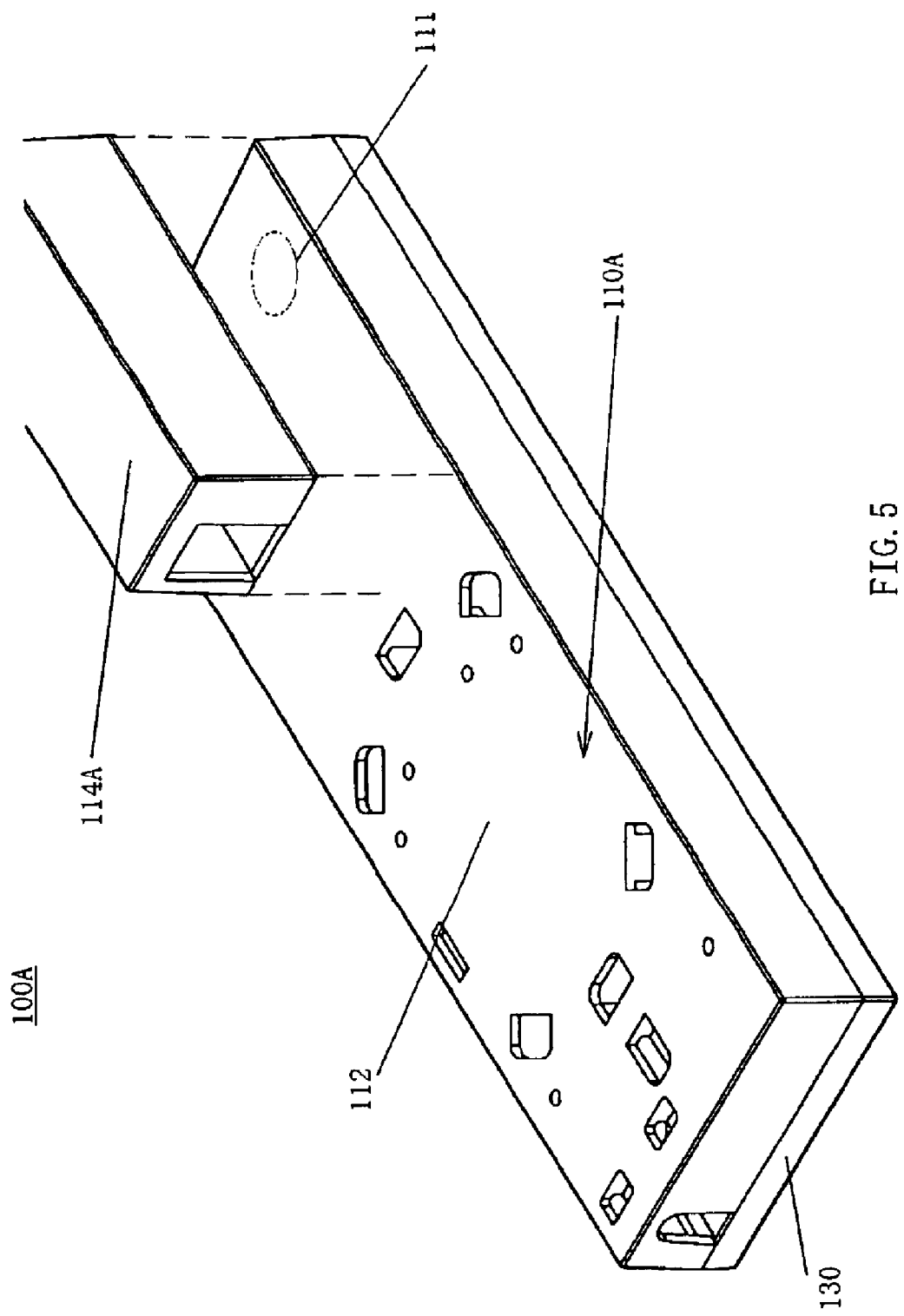
FIG. 5 is an exploded perspective view of a variation of the accommodation apparatus shown in FIG. 1.

Although the instant embodiment forms the connection protecting part 114 and the body 110 as one member, the connection protecting part 114 may be formed as a separate member from the body 110 as shown in FIG. 5. Here, FIG. 5 is an exploded perspective view of a variation of the accommodation apparatus 100. The accommodation apparatus 100 is different from the accommodation apparatus 100A in that a connection protecting part 114 may be detachable from a body 110A, which has a rectangular shape, as shown in FIG. 5. A hole 111 is formed on the body 110A to introduce the OFC 10 in the body 110A through the connection protecting part 114A. Such a configuration may also exhibit an effect similar to that of the connection protecting part 114A. When there are plural types of connection protecting parts 114A each having a different height, this configuration may commonly use one accommodation apparatus 100A by selecting one of connection protecting parts 114A, which is suitable for one of various external apparatuses having various heights.

The locus arrangement parts 116 define an orientation of accommodated OFC 10 so that the OFC 10 in the body 110 has a curvature of a predetermined curvature or larger. The instant embodiment exemplarily makes the locus arrangement parts 116 of a plurality of L-shaped plate members raised from the bottom of the body 110 to house the OFC 10 in the body 110 along the locus arrangement parts 116. Specifically, the locus arrangement parts 116 are provided so that they alternately face the inside and the outside along the accommodated OFC 10. The OFC 10 is aligned with each locus arrangement part 116 when accommodated in the body 110. The locus arrangement part 116 defines an orientation of the OFC 10 accommodated in the accommodation apparatus 100 so that the OFC 10 may have a curvature equal to or larger than a predetermined value.

As discussed, the OFC 10 easily deteriorates its transmission performance and gets damaged when it is bent and its curvature becomes smaller than the necessary value. However, the inventive accommodation apparatus 100 accommodates the OFC 10 along the locus arrangement parts 116, and necessarily defines its curvature as the predetermined value or larger. Once an arrangement of the locus arrangement parts 116 is determined which provides the OFC 10 with a predetermined curvature, the accommodation apparatus 100 may efficiently accommodate the OFC 10 without deteriorating its transmission performance. The predetermined curvature is a radius of curvature r=30 mm in this embodiment, but the locus arrangement parts 116 may have a larger radius of curvature. Indeed, the radius of curvature near the mechanical splice 122 is larger than the predetermined curvature. The predetermined curvature is a variable value depending upon the thickness of the OFC 10 and its transmission performance. Positions and the number of the locus arrangement parts 116 may be arbitrarily determined so that cable's transmission performance may not be deteriorated and the cable may not be damaged.

The locus arrangement part 116 serves to hold the OFC 10 using its L shape. As understood from FIG. 2 as an exploded perspective view viewed from the bottom, the OFC 10 hangs down due to its own weight when accommodated in the accommodation apparatus 100. The L shape of each locus arrangement part 116 may hold the OFC 10 that hangs down due to its own weight. This function is useful to hold the OFC 10 and effective to define a locus of the accommodated OFC 10.

Figure 6:
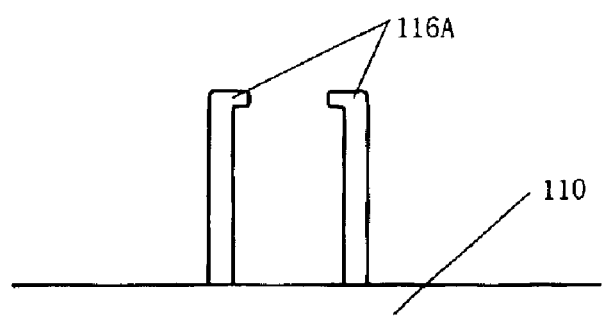
FIG. 6 is an enlarged side view of a locus arrangement part as a variation of the accommodation apparatus shown in FIG. 1.
Figure 7:
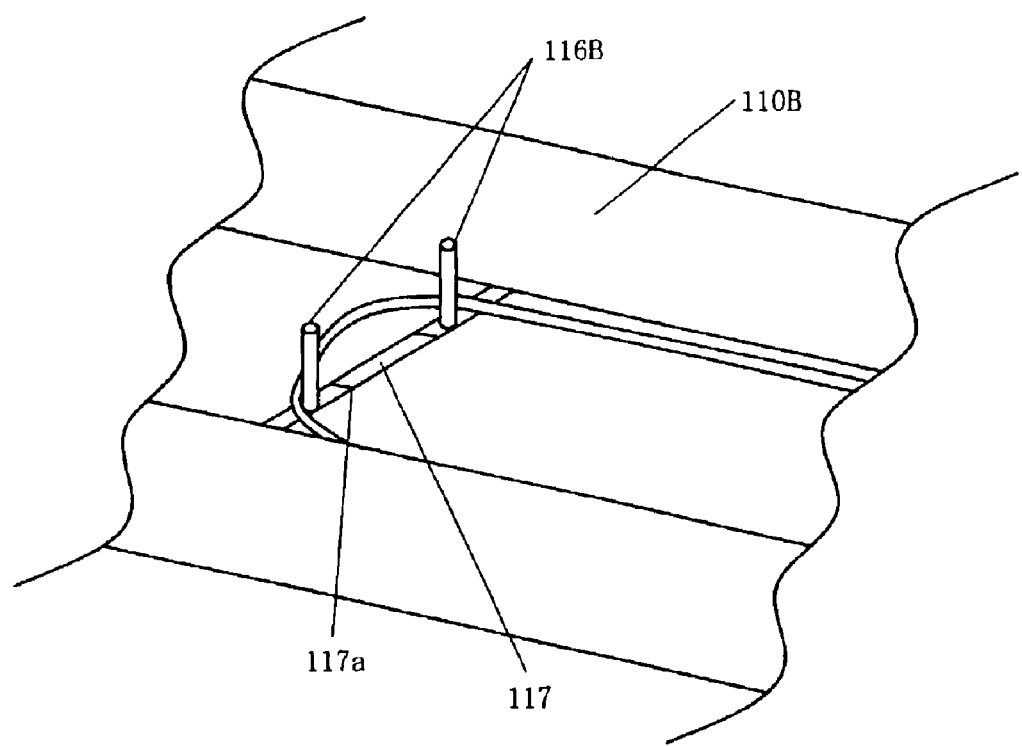
FIG. 7 is an enlarged perspective view of a locus arrangement part as a variation of the accommodation apparatus shown in FIG. 1.

The instant embodiment makes each locus arrangement part 116 of an L-shaped plate member, but the locus arrangement part 116 may be formed by another member having similar operation and effect, as shown in FIGS. 6 and 7. Here, FIG. 6 is an enlarged side view of a locus arrangement part 116A as a variation of the accommodation apparatus 100 shown in FIG. 1. FIG. 7 is an enlarged perspective view of a locus arrangement part 116B as a variation of the accommodation apparatus 100 shown in FIG. 1. It is noted that FIGS. 6 and 7 are exemplary and representative variations having similar operations and effects.

Referring to FIG. 6, the locus arrangement part 116A is implemented, for example, by a pair of standing rod members, which are spaced at a preset interval to hold the accommodated OFC 10. A plurality of locus arrangement parts 116A may be provided at a proper interval as the locus arrangement parts shown in FIG. 2 or one continuous locus arrangement part 116A for forming the orientation of the accommodated OFC 10, but the proper interval should maintain the curvature of a predetermined value or larger for the accommodated OFC 10. The locus arrangement parts 116A in FIG. 6 may be made elastic and crossed with each other or their interval may be tapered from the body 110 to the top, so as to hold the OFC 10. Such a structure may hold the OPC as the locus arrangement parts 116, and exhibit effects similar to the locus arrangement parts 116 including the L-shaped plate members.

Referring to FIG. 7, the locus arrangement parts 116 may be made movable relative to the body 110. While the locus arrangement parts 116 shown in FIG. 2 are integrated with the body 110 and the integration covers a direct integration such as bonding, the locus arrangement parts 116 may be replaced with a plurality of the locus arrangement parts 116B movable along a groove formed on part of the body 110B. Such a structure may form a curvature necessary for the accommodated OFC 10 by moving the locus arrangement parts 116B along the groove 117. The stopper 117a may be provided in the groove 117 to restrict the movement of the locus arrangement part 116B. While the variation shown in FIG. 7 forms the groove linearly, the groove 117 may have a radius of curvature to some extent (although it is larger than the above predetermined value). As positions of the locus arrangement parts 116B become variable, the accommodation orientation may be defined accurately.

The openings 118a and 118b are openings to make connectible the accommodated OFC 10 to the external apparatus. The opening 118a is an opening to make connectible the connection port of the external apparatus mounted on the body 110 to the accommodated OFC 10, and provided in the connection protecting part 114 facing the support part 112. The opening 118b is an opening to introduce an extra part of the OFC 10 (such as a long-distance OFC introduced from the outside) into the accommodation apparatus 100, and provided in the body side surface 110b. The openings 118a and 118b are so dimensioned that they may provide the above connections.

One end of the OFC 10 positioned at the side of the opening 118a is connected to the external apparatus and thus its movement is restricted in the accommodation apparatus 100, but it is conceivable that the other end of the OFC 10 positioned at the side of the opening 118b moves in the accommodation apparatus 100. As a result, when the OFC 10 is pulled out from the accommodation apparatus 100, for example, the OFC strongly winds around the locus arrangement parts 116 and possibly gets damaged.

Accordingly, the instant embodiment provides fixture means 120 for fixing the accommodated OFC 10 near the opening 118b in the body 110. The instant embodiment implements the fixture means 120 using a band member attached to the body 110, which may vary the fixation state arbitrarily. The present invention is not limited to this embodiment; for example, the fixation of the OFC 10 in the opening 118b may use any mechanical means.

The mechanical splice 122, in FIG. 3, is provided to connect, in the body 110, the extra cable 10b of the OFC 10 to the OFC 10a connectible to the external apparatus. The mechanical splice 122, in FIG. 3, is known in the art, and a general description is included. According to FIG. 3, the OFC 10a attached to the connection part connectible to the external apparatus is connected through the mechanical splice 122 to the extra cable 10b of the OFC 10 that has been introduced from the outside. The extra cable 10b of the OFC 10 connected to the mechanical splice 122 is accommodated along the locus arrangement parts 116, and pulled out to the outside through the opening 118.

The cover 130 serves as a lid of the accommodation apparatus 100, and detachably coupled to the body 110. The cover 130 has the same shape as the bottom surface 110c of the body 110, and includes holes 132 used to screw the body 110. The instant embodiment has four holes 132 exemplarily and the cover 130 is attached to the body 110 by connecting the screws 20 in the holes 132.

Thus, the inventive accommodation apparatus 100 accommodates the OFC 10 in its body 110, and may protect the OFC 10 from the external force that is otherwise applied to the OFC 10. The locus arrangement parts 116 fix the orientation of the OFC 10 accommodated in the body 110 so as to maintain the desired transmission capability. Thereby, the extra part of the OFC 10 may be effectively accommodated while the transmission performance of the OFC 10 is maintained. As the inventive accommodation apparatus 100 thus fixedly supports the media converter 200 to be connected to the accommodated OFC 10, the positional relationship between the OFC 10 and the media converter 200 does not change or their connection does not deteriorate when the media converter 200 is manipulated. As a consequence, the OFC 10 may maintain its good transmission performance.

The OFC 10 is a cable for optical communications, and made of thin fiber of transparent dielectric, such as glass and plastic. Structurally, it includes a core of a large refractive index at its center, and a clad of a small refractive index around the core. An electric signal converted into a light signal propagates through the core while totally reflected due to a difference of refractive indexes between the core/clad boundaries. The OFC 10 has a multimode that allows multiple modes to be transmitted due to the difference of refractive indexes between the core/clad boundaries and core's diameter, and a single mode that allows only one mode to be transmitted. Advantageously, the OFC 10 has such small attenuation that it may achieve a long-distance transmission without any interconnecting device. In addition, because of its thin cable diameter and large transmission amount of 100 Mbps to several Gbps, the OFC 10 has a larger transmission amount per cable's sectional area than that of the metal cable. On the other hand, the OFC 10 is disadvantageously vulnerable to bending, and damaged by excessive bending. The inventive accommodation apparatus 100 solves these problems including a deteriorated transmission performance due to bending by effectively handling the extra cable of the OFC 10 with such characteristics.

Figure 8:
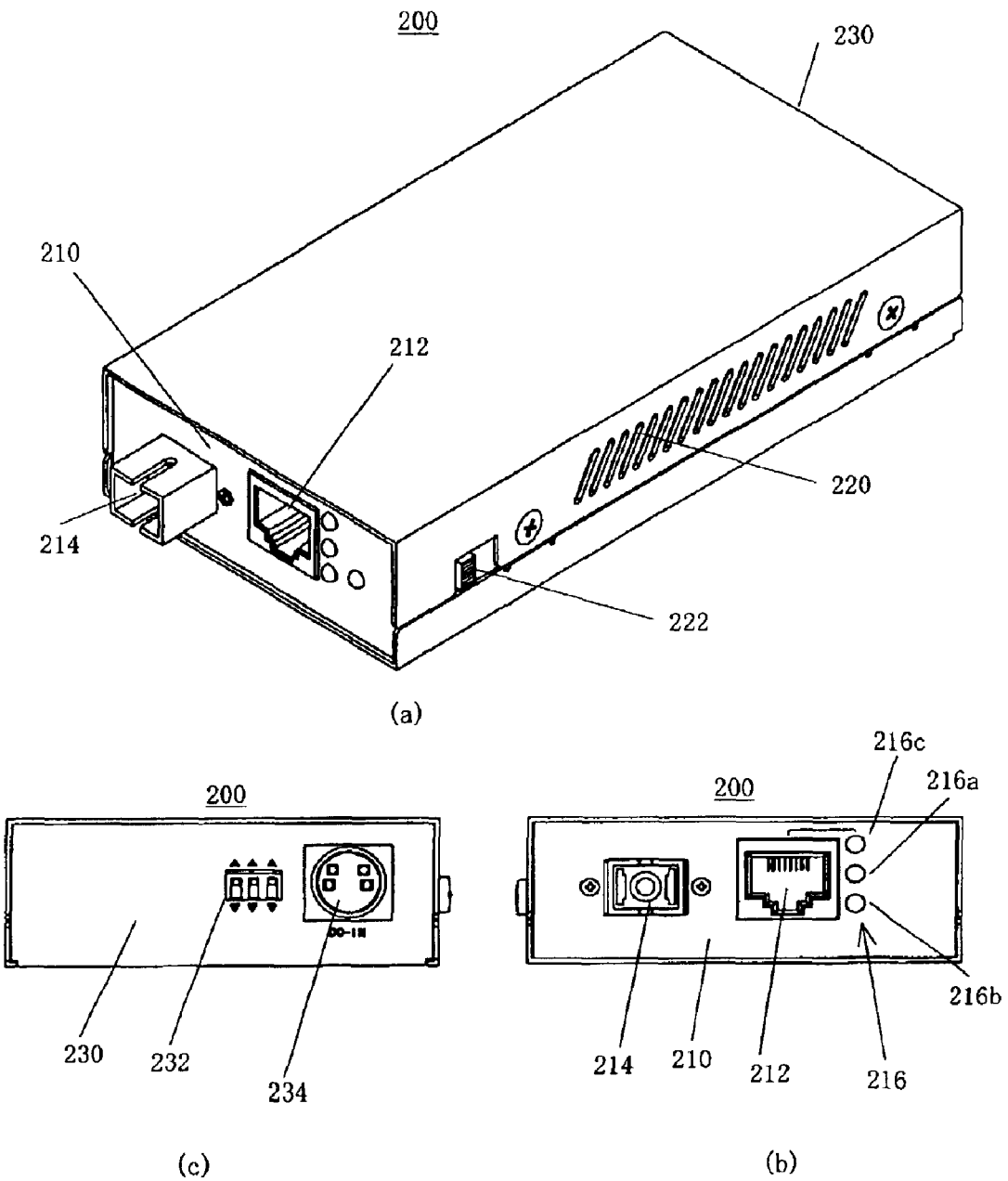
FIGS. 8A, 8B and 8C, respectively, are schematic perspective, schematic side and schematic side views of a media converter.

The media converter 200 converts a signal for one medium to a signal for a different medium, such as the UTP cable to the OFC 10. The media converter 200 includes, as shown in FIG. 8A, a front surface 210, a side surface 220, and a rear surface 230. Here, FIG. 8A is a schematic perspective view of the media converter 200. FIG. 8B is a schematic side view of the front surface 210 of the media converter 200 shown in FIG. 8A. FIG. 8C is a schematic side view of the rear surface 230 of the media converter 200 shown in FIG. 8A.

The front surface 210 includes, as shown in FIG. 7B, a 100BASE-TX port 212, a 100BASE-FX port 214, and three setup-confirming LED lamps 216.

The 100BASE-TX port 212 is a connector to be connected to a UTP cable (not shown) that is connected to an external device, such as a hub in the Ethernet. The 100BASE-TX port 212 has an automatic recognition function of Full Duplex/Half Duplex, and operates in a mode in accordance with an external device to be connected.

The 100BASE-FX port 214 is a connector to be connected to the OFC 10. The OFC 10 is connected, for example, to an optical network.

The LED lamps 216 are used to confirm a configuration for communications, and include an LED lamp 216a for identifying a link test, an LED lamp 216b for identifying a connection of the 100BASE-FX port 214, and an LED lamp 216c for identifying the 100BASE-TX port 212.

The side surface 220 includes an MDI/MDI-X switch 222. The MDI/MDI-X switch 224 is a switch to determine whether the 100BASE-TX port 212 is used as a cascade connection port or as a normal MDI-X port.

The rear surface 230 includes, as shown in FIG. 8C, a communication mode switch 232 and a DC jack 234. The communication mode switch 222 is a switch to set up the communication mode (Full Duplex/Half Duplex), and selects the same communication mode as that of the device connected to the 100BASE-FX port 214. The DC jack 234 is a connector to which a DC cable 340 is connected.

Figure 9:
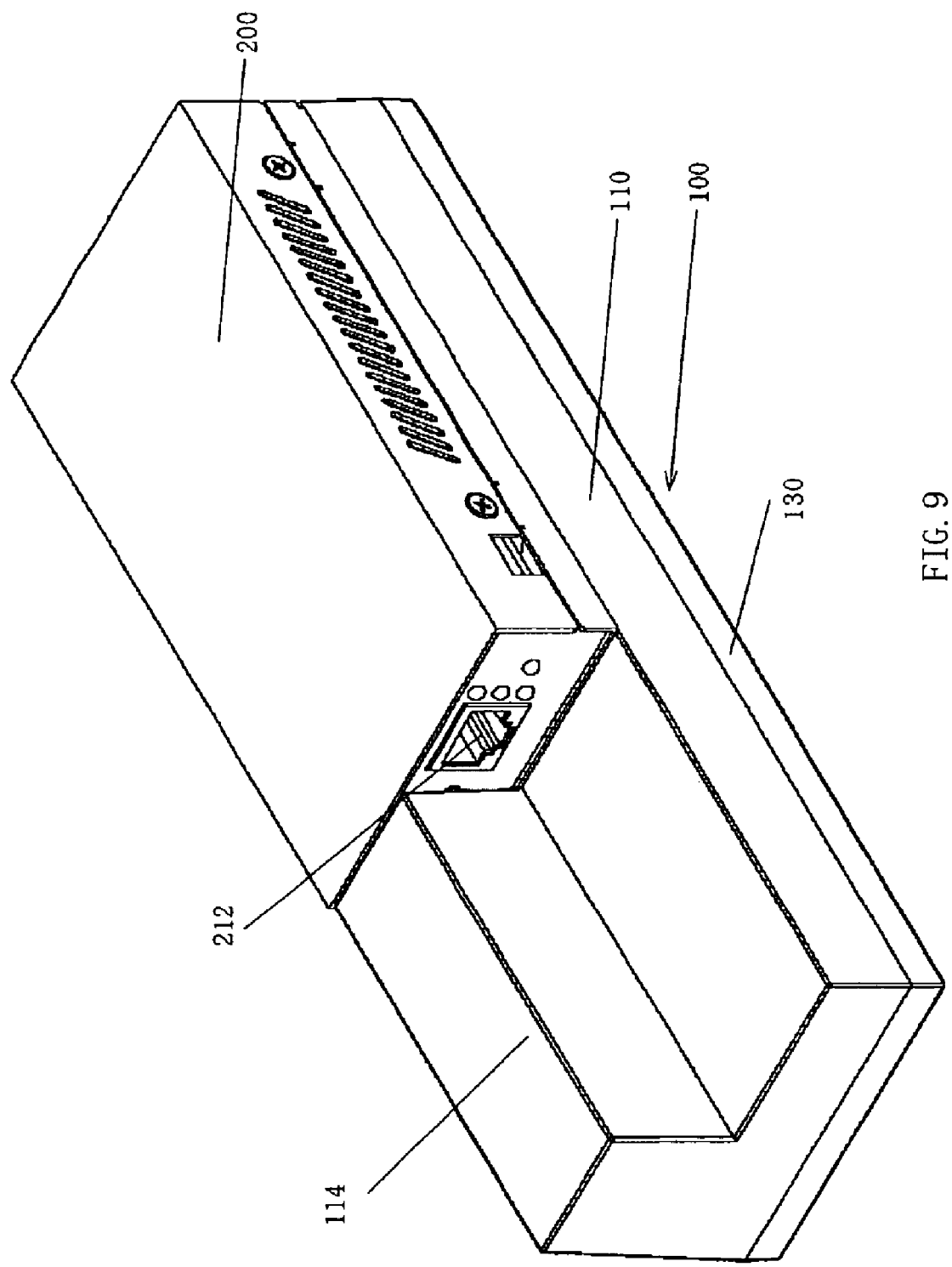
FIG. 9 is a schematic perspective view the accommodation apparatus shown in FIG. 1 is mounted with the media converter shown in FIG. 8.

A description will now be given of an attachment, exchange, and wire configuration of the media converter 200 accommodated in the accommodation apparatus 100, with reference to FIG. 9. Here, FIG. 9 is a schematic perspective view of the accommodation apparatus 100 shown in FIG. 1 mounted with the media converter 200. In attaching the media converter 200, the cover 130 is detached from the body 110. Then, the media converter 200 is mounted onto the support part 112 of the body 110. The media converter 200 is arranged so that the front surface 210 faces the protection connecting part 114. Then, the media converter 200 is fixed onto the support part 112 through the screws 21 from the inside of the body 110 and screw holes 113 in the support part 112. The screw attachment is omitted, for example, when the support part 112 and the media converter 200 are connected by a mechanical means other than the screw attachment.

Following the screwing step, the UTP cable (not shown) is connected to the 100BASE-TX port 212, the DC cable (not shown) is connected to the DC jack 234. The OFC 10, in particular, the OFC 10a with a connector 12 shown in FIG. 3, is connected to the 100BASE-FX port 214 from the inside of the body 110 through the opening 118a, shown in FIG. 3, in the connection protecting part 114 in FIG. 3.

The other end of the OFC 10a is connected, through the mechanical splice 122, to the OFC 10b pulled out to the outside, and thus the connection between the media converter 200 and the OFC 10 is completed. The extra length cable part of the OFC 10b is accommodated in the body 110 along the locus arrangement parts 116 while the necessary locus of accommodation is maintained. Once the cover 130 is screwed onto the body 110, only the extra part is accommodated in the apparatus 100 while the OFC 10 is connected to the media converter 200.

The reverse procedure is conducted in exchanging the media converter 200.

Thus, the inventive accommodation apparatus 100 accommodates the OFC 10 in its body 110, and protects the OFC 10 from the external force that is otherwise applied to the OFC 10. The locus arrangement part 116 fixes the orientation of the OFC 10 accommodated in the body 10 so as to maintain the desired transmission capability. Thereby, the extra part of the OFC 10 may be effectively accommodated while the transmission performance of the OFC 10 is maintained.

Next, a description will be given of the operation and change of the operation of the media converter 200. After the media converter 200 is fixed onto the support part 112, the communication mode switch 232 and the MDI/MDI-X switch 222 are manipulated. The communication mode switch 232 may select the Full Duplex (bi-directional simultaneous communication) or the Half Duplex (one-way directional communications). After the UTP cable is connected, the MDI/MDI-X switch 222 provided at the side surface of the media converter 200 selects and sets up the a HUB (for use as a cascade connection port with a repeater or switch) or an XPC (for use as a normal 100BASE-TX port). The similar procedure applies to the setup change.

The configuration of the media converter 200 may be confirmed using the LED lamps 216.

As the inventive accommodation apparatus 100 thus fixedly supports the media converter 200 to be connected to the accommodated OFC 10, the positional relationship between the OFC 10 and the media converter 200 does not change or their connection does not deteriorate when the media converter 200 is manipulated. As a consequence, the OFC may maintain its good transmission performance.

Further, the present invention is not limited to these preferred embodiments, and various variations and modifications may be made without departing from the scope of the present invention. For example, the present invention is applicable to the normal wire LAN system.

Thus, the inventive accommodation apparatus accommodates the OFC in its inside, and protects the OFC from the external force that is otherwise applied to the OFC. The locus arrangement part fixes the orientation of the OFC accommodated in the apparatus so as to maintain the desired transmission capability. Thereby, the extra part of the OFC may be effectively accommodated while the transmission performance of the OFC is maintained. As the inventive accommodation apparatus thus fixedly supports the media converter to be connected to the accommodated OFC, the positional relationship between the OFC and the media converter does not change or their connection does not deteriorate when the media converter is manipulated. As a consequence, the OFC may maintain its good transmission performance.

What is claimed is:

1. An accommodation apparatus for a transmission medium, said accommodation apparatus comprising:
   a housing for accommodating the transmission medium;
   an arrangement part, located in said housing, for arranging an orientation of the transmission medium accommodated in said housing so as to prevent a transmission capability of the transmission medium from getting damaged due to an excessive bending; and
   a mount part provided on an outer part of said housing, for supporting, on said housing, an external apparatus connectable to the transmission medium, said mount part being basically as wide as the external apparatus.

2. An accommodation apparatus according to claim 1, wherein the housing has an opening that enables the transmission medium accommodated to be connected to an external apparatus.

3. An accommodation apparatus according to claim 1, further comprising a protection part for protecting a connection part between the transmission medium and an external apparatus connectible to the transmission medium.

4. An accommodation apparatus according to claim 3, wherein said protection part has a connection opening that enables the external apparatus to be connected to the transmission medium when the external apparatus is mounted onto said housing, and a convex shape that covers the transmission medium around the connection opening.

5. An accommodation apparatus according to claim 4, wherein said protection part is formed by partially raising said housing.

6. An accommodation apparatus according to claim 1, wherein the external apparatus is a media converter.

7. An accommodation apparatus according to claim 1, wherein said mount part is designed such that the accommodation apparatus, mounted with the external apparatus, has an approximately rectangular parallelopiped shape.

8. An accommodation apparatus for a transmission medium, said accommodation apparatus comprising:
   a housing for accommodating the transmission medium;
   an arrangement part, located in said housing, for arranging an orientation of the transmission medium accommodated in said housing so that the transmission may have a predetermined curvature; and
   a mount part provided on an outer part of said housing, for supporting, on said housing, an external apparatus connectable to the transmission medium, said mount part being basically as wide as the external apparatus.

9. An accommodation apparatus according to claim 8, wherein the predetermined curvature has a radius of 30 mm or larger.

10. An accommodation apparatus according to claim 8, wherein the transmission medium is an optical fiber cable.

11. An accommodation apparatus according to claim 8, wherein said housing may be mounted with an external apparatus connectable to the transmission medium accommodated.

12. An accommodation apparatus according to claim 8, wherein said arrangement part has an approximately L shape.

13. An accommodation apparatus according to claim 8, wherein said housing has a mechanical splice for connecting the transmission medium to another transmission medium.

14. An accommodation apparatus according to claim 8, wherein said mount part is designed such that the accommodation apparatus, mounted with the external apparatus, has an approximately rectangular parallelopiped shape.

* * * * *